United States Patent
Shanmugam et al.

(10) Patent No.: US 12,537,994 B2
(45) Date of Patent: Jan. 27, 2026

(54) SELECTIVE CONTENT MASKING FOR COLLABORATIVE COMPUTING

(71) Applicant: Google LLC, Mountain View, CA (US)

(72) Inventors: Dhandapani Shanmugam, Bangalore (IN); Sreenivas Makam, Bangalore (IN)

(73) Assignee: GOOGLE LLC, Mountain View, CA (US)

(*) Notice: Subject to any disclaimer, the term of this patent is extended or adjusted under 35 U.S.C. 154(b) by 233 days.

(21) Appl. No.: 18/263,597

(22) PCT Filed: Jun. 2, 2022

(86) PCT No.: PCT/US2022/031976
§ 371 (c)(1),
(2) Date: Jul. 31, 2023

(87) PCT Pub. No.: WO2022/256539
PCT Pub. Date: Dec. 8, 2022

(65) Prior Publication Data
US 2024/0089537 A1      Mar. 14, 2024

(51) Int. Cl.
*H04N 21/4545* (2011.01)
*H04L 65/403* (2022.01)

(52) U.S. Cl.
CPC ..... *H04N 21/45455* (2013.01); *H04L 65/403* (2013.01)

(58) Field of Classification Search
CPC ........................ H04N 21/45455; H04L 65/403
See application file for complete search history.

(56) References Cited

U.S. PATENT DOCUMENTS

| | | |
|---|---|---|
| 8,826,322 B2 | 9/2014 | Bliss et al. |
| 9,762,855 B2 | 9/2017 | Browne et al. |
| 10,713,794 B1 | 7/2020 | He et al. |

(Continued)

FOREIGN PATENT DOCUMENTS

| | | |
|---|---|---|
| WO | WO2020/243059 | 12/2020 |
| WO | WO2021/033853 | 2/2021 |

OTHER PUBLICATIONS

International Preliminary Report on Patentability for Application No. PCT/US2022/031976, mailed Dec. 14, 2023, 9 pages.

(Continued)

*Primary Examiner* — Amal S Zenati
(74) *Attorney, Agent, or Firm* — DORITY & MANNING P.A.

(57) ABSTRACT

A machine-learned sharing system and methods are provided for sharing content with users while masking sensitive information. The system receives a content stream for display to one or more users, converts the content stream into image data representative of at least a portion of the content stream, inputs the image data into a machine-learned model configured for masking sensitive content within shared content, receives from the machine-learned model a first mask indicative of a region within the first content stream that contains sensitive content, and renders a display of the content stream that masks the sensitive content based at least in part on the first mask indicative of the region of the first content stream having the sensitive content.

20 Claims, 10 Drawing Sheets

(56) References Cited

U.S. PATENT DOCUMENTS

| | | | |
|---|---|---|---|
| 11,006,077 B1* | 5/2021 | Truong | H04N 7/15 |
| 2011/0314387 A1 | 12/2011 | Gold et al. | |
| 2015/0032686 A1 | 1/2015 | Kuchoor | |
| 2015/0371049 A1* | 12/2015 | Xavier | G06T 11/00 |
| | | | 726/26 |
| 2020/0159958 A1 | 5/2020 | Kochura et al. | |
| 2020/0218961 A1 | 7/2020 | Kanazawa et al. | |
| 2020/0314483 A1 | 10/2020 | Rakshit et al. | |
| 2021/0182430 A1* | 6/2021 | Negi | G06F 21/6263 |

OTHER PUBLICATIONS

Perrigo, "Chrome is Finally Rolling Out the Ability to Hide Your Notifications While Screen Sharing.", Jan. 27, 2021, https://chromeunboxed.com/chrome-auto-hide-notifications-while-screensharing, retrieved on May 6, 2021, 4 pages.

Sultana et al., "Evolution of Image Segmentation Using Deep Convolutional Neural Network: A Survey", Knowledge-Based Systems, Elsevier, vol. 201, May 26, 2020, Amsterdam, Netherlands, XP086179027, 38 pages.

International Search Report for Application No. PCT/US2022/031976, Sep. 9, 2022, 4 pages.

\* cited by examiner

SELECTIVE CONTENT MASKING FOR COLLABORATIVE COMPUTING

PRIORITY CLAIM

The present application is based on and claims the right of priority under 35 U.S.C. § 371 to International Application No. PCT/US2022/031976 filed on Jun. 2, 2022, which claims priority to Indian Application No. 202141024542 having a filing date of Jun. 2, 2021. Applicant claims priority to and the benefit of each of such applications and incorporates all such applications herein by reference in their entirety.

FIELD

The present disclosure relates generally to content sharing for collaborative computing environments such as multi-attendee video conferencing systems and projector systems.

BACKGROUND

Collaborative computing environments such as multi-attendee video conferencing systems and projective display systems can allow users to view one another, communicate, and/or share content such as video, audio, web pages, etc. As an example, a speaking attendee of a video conference hosted by a videoconferencing system may be displayed in a first display region of a graphical user interface while non-speaking attendees may be displayed in other display regions. Some video conferencing techniques permit content sharing between attendees during a video conference. For example, some systems may permit an attendee to share all or a portion of their display with other attendees who may view the content currently rendered on the display.

While current video conferencing techniques may enable attendees to share content, there remains a need for techniques to advance collaboration and interaction between multiple attendees of a video conference.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for sharing content within a videoconferencing application includes receiving, by a computing system comprising one or more computing devices, a request from a first participant in a video conference to share with one or more additional participants of the video conference a first content stream within the videoconferencing application, converting at least a portion of the first content stream into image data representative of a display of the first content stream, inputting the image data representative of the display of the first content stream into a machine-learned model configured for masking sensitive content within shared content, receiving from the machine-learned model a first mask indicative of a region within the first content stream that contains sensitive content, and rendering for the video conference a display of the first content stream that masks the sensitive content based at least in part on the first mask indicative of the region of the first content stream having the sensitive content.

Another example aspect of the present disclosure is directed to a computing system including one or more processors one or more non-transitory, computer-readable media that store instructions that when executed by the one or more processors cause the computing system to perform operations. The operations include receiving a request from a first participant in a video conference to share with one or more additional participants of the video conference a first content stream within a videoconferencing application, converting at least a portion of the first content stream into image data representative of a display of the first content stream, inputting the image data representative of the display of the first content stream into a machine-learned model configured for masking sensitive content within shared content, receiving from the machine-learned model a first mask indicative of a region within the first content stream that contains sensitive content, and rendering for the video conference a display of the first content stream that masks the sensitive content based at least in part on the first mask indicative of the region of the first content stream having the sensitive content.

Yet another example aspect of the present disclosure is directed to one or more non-transitory computer-readable media that store instructions that, when executed by one or more processors of a computing system, cause the computing system to perform operations. The operations include receiving a first content stream for display to one or more users, converting the first content stream into a plurality of image frames including image data representative of at least a portion of the first content stream, inputting the plurality of image frames into a machine-learned model configured for masking sensitive content within shared content, receiving from the machine-learned model a first mask indicative of a region within the first content stream that contains sensitive content, and rendering a display of the first content stream that masks the sensitive content based at least in part on the first mask indicative of the region of the first content stream having the sensitive content.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing a video conferencing system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
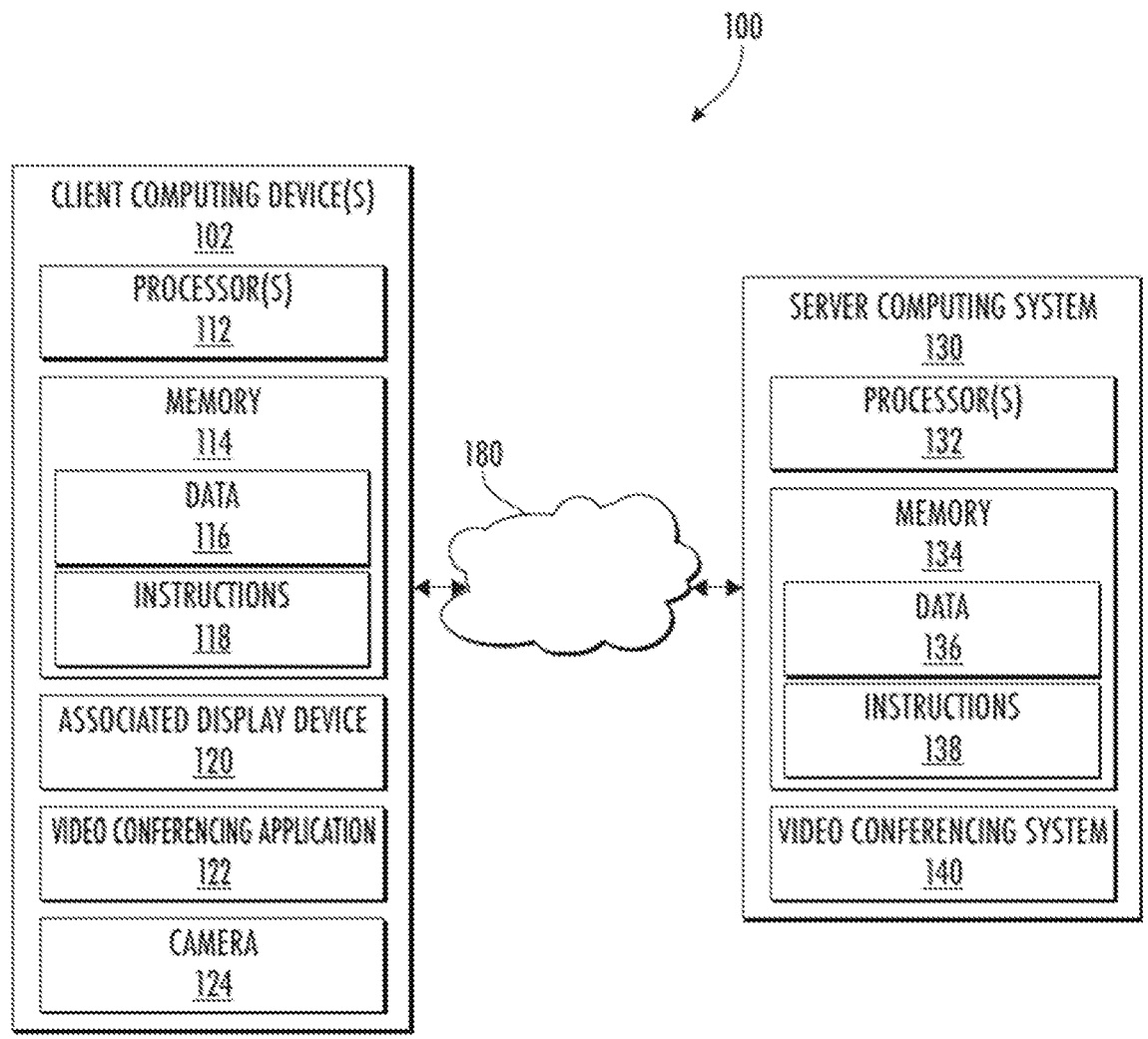
FIG. 1 depicts a block diagram of example computing systems according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure relates to computing systems that include one or more machine-learned models for selectively masking sensitive information in content that is shared by a user with other individuals such as viewers of a projective display or participants in a video conference. More particularly, the present disclosure is directed to computing technology for automatically identifying sensitive content in content streams shared by a user and masking such sensitive content so that it is not visible in displays of the content streams for additional users. The disclosed technology provides a machine-learned system that is configured to analyze content such as a web page, game, video, document, etc. and identify one or more portions of the content that contain sensitive content. Sensitive content can include advertisements, personal information, confidential information, proprietary information or any other content that the system is trained to identify for masking. The system can generate a mask that identifies one or more regions in the content that contain sensitive content. Using the mask, the system can render a display of the content stream that masks the sensitive content at the one or more regions identified by the mask. By way of example, the system can analyze the shared content and determine one or more colors that are representative of the content. The system can render the one or more representative colors at the one or more regions identified by the mask. Masking can be performed in any form. For instance, the system can provide any representative content such as a color, greyscale, black, watermarked, or other content at the one or more regions represented by the mask.

By way of example, a videoconferencing system can provide or otherwise be associated with a videoconferencing application that includes a graphical user interface (GUI). The GUI can be rendered on a display of respective client computing devices for attendees of a video conference. The GUI may include individual slates that render content associated with the slate. For instance, a first slate may render a video stream associated with a first attendee and a second slate may render a video stream associated with a second attendee. Additional slates may be instantiated for the video streams of other attendees and/or for rendering additional content such as a document being shared by one of the attendees. In accordance with example aspects of the present disclosure, the videoconferencing system can include a machine-learned system that is configured to analyze content that is shared by a first attendee, identify sensitive information within the content, and render a display of the content for other attendees such that the sensitive information is not visible. For instance, the videoconferencing system can mask the sensitive information by hiding, replacing, or supplementing the content such that the sensitive information is not visible in the display of the content for other attendees of the videoconference.

Similarly, a projector or other display system may selectively mask sensitive information in a display of a shared content stream. A projector or other device in communication with a projector can access a content stream to be shared, analyze the content using a machine-learned model to identify sensitive information within the content, and render a display of the content for projection to other viewers such that the sensitive information is not visible. For instance, the projector can mask the sensitive information by hiding, replacing, or supplementing the content such that the sensitive information is not visible in a projected display of the content.

In accordance with example aspects of the present disclosure, a machine-learned sharing system is provided for selectively masking sensitive information in content that is to be shared by a first user with other users, such as participants in a video conference or viewers of a projected display. The machine-learned sharing system can receive a content stream to be shared by the first user. The sharing system can input the content stream into a machine-learned masking system that is configured to identify sensitive information within the content to be shared. The machine-learned masking system can include one or more machine-learned models that are trained to identify sensitive information such as personal, confidential, and/or proprietary information within content. The machine-learned model(s) can be trained to identify different types of sensitive information by training the model(s) using training data that includes content labeled to identify the target sensitive information to be located. The machine-learned model can detect one or more regions in the shared content that contain sensitive information and generate one or more masks that represent the one or more region(s). The system can render or otherwise provide a modified content stream that masks the detected regions so that the sensitive information is not visible. The system can mask the sensitive information by hiding, replacing, covering, obscuring, or otherwise causing the sensitive information not to be visible in a display of the content that is viewable by the additional users.

Various techniques can be used to implement the machine-learned sharing system. In accordance with example embodiments, a machine-learned masking system can include one or more machine-learned models that are configured to receive a shared content stream and generate one or more masks that identify sensitive content regions within the shared content stream. The system can generate a modified content stream with the sensitive information masked so that it is not visible in a display of the shared content. Example machine-learned models may include detection modes, recognition models, classification models, clustering models, or other models.

According to example embodiments, a machine-learned masking system can include a machine-learned model that is configured to analyze image data representative of a shared content stream in order to identify sensitive information. In some examples, a machine-learned image classification model can be used. The machine-learned masking system can include a frame generator that is configured to receive a content stream that is to be shared with other users such as participants in a video conference or viewers of a projector display. The frame generator can convert the content stream into image data for processing by the machine-learned model. The frame generator can convert various content types including text content, video content, etc. into image data for processing. In some embodiments, the frame generator can generate a plurality of image frames from the source content. The frame generator can provide the image frames to the machine-learned model. Each image frame can include image data that represents at least a portion of the source content.

In some examples, a machine-learned model can perform one or more classifications, clusters, detections, recognitions, etc. of content in the received image frames. In response to identifying sensitive content within one or more image frames, the model can locate one or more regions of the source content that contain the sensitive information. The model can generate one or more masks that represent the region(s) of the source content that contain sensitive information. For example, the model can generate a mask that identifies the region within one or more of the image frames received from the frame generator.

According to an example aspect of the disclosed technology, the machine-learned model can partition or otherwise divide an image frame into a set of logical partitions representing content portions of the source content. The logical partitions can be generated using image segmentation or other techniques. The model can identify one or more of the logical partitions corresponding to the sensitive content. The mask can be generated in accordance with the one or more logical partitions. For example, the mask can represent one or more regions of the source content that correspond to the one or more logical partitions.

According to some aspects, the mask(s) generated by the model are provided to a rendering engine that generates a masked content stream where the source content in region(s) identified by the mask(s) are not visible. In some examples, the model generates one or more low-resolution masks that are provided to a refinement engine that generates one or more refined masks which are in turn provided to the rendering engine. The refinement engine may receive image data from the source content such as video texture data. The refinement engine can generate a refined or high-resolution mask that more accurately defines the region(s) containing sensitive content. Using a low-resolution mask or a refined mask, the rendering engine can generate a masked content stream with the sensitive information masked from display. The rendering engine can utilize various techniques to mask the sensitive information. By way of example, the rendering engine can hide, cover, and/or replace the sensitive information. In some examples, the rendering engine can render one or more representative colors in the region(s) identified by the mask(s). The rendering engine may determine a representative color from the source content, such as a representative color that is an average of color values from the source content. Other techniques can be used to determine the representative color. The rendering engine can replace or otherwise mask the source content at the identified regions by rendering the representative color(s) at the regions identified by the mask(s). In other examples, other representative content such as a watermark, greyscale, black or other content can be used in place of the sensitive information.

The masking system can provide the masked content for display by one or more applications. For instance, the source content may originate as one or more web pages that are accessed by a client web browser. A first participant in a video conference or a user of a projector system may select the web browser content for sharing in the video conference or for display by the projector system. The masking system can generate the masked content stream which is provided to the web browser for display. A videoconferencing system or the projector system can display the masked content using the client web browser.

According to an example aspect of the present disclosure, a machine-learned masking system can track sensitive information between frames representing source content to be shared. For instance, the location of sensitive information within source content may change as the frames progress through a shared content stream. The masking system can identify the region(s) containing sensitive information and track those regions between frames. Accordingly, the masking system may determine that a first frame representing source content contains sensitive information in a first region of the source content and that a second frame contains sensitive information in a second region of the source content. The model can generate a first mask that identifies the first region in the first frame and a second mask that identifies the second region in the second frame. In this manner, the system can track and mask sensitive information in sequential frames representing source content.

Another example aspect of the present disclosure is directed to techniques for training one or more models to identify sensitive information or content such as personal information, advertisements, proprietary information, confidential information and the like. The model(s) can be trained using a training computing system including one or more computing devices such as one or more servers configured as a cloud computing environment. In some examples, one or more models can be additionally or alternatively trained while provisioned at a computing device, such as a local computing device. In some examples, a model can be trained at a server computing device and later refined through additional training based on data generated in response to a particular user and/or a particular device.

The model(s) of the machine-learned system can be trained at a training computing system, such as by back-propagation of errors using a loss function. The training computing system can optimize the model for generating inferences indicative of sensitive content within a shared content stream. The training computing system can obtain training constraints associated with model(s) in example embodiments. The model training computing system can train the model based on a set of training data and the training constraints. The training computing system can train the machine-learned model by determining one or more parameters of a loss function based on the training constraints and the set of training data. The model training computing system can modify at least a portion of the machine-learned model based at least in part on the one or more parameters of the loss function. For example, one or more of the models of the machine-learned systems can be modified based on backpropagation of a sub-gradient of the loss function.

According to an example aspect of the disclosed technology, a machine-learned model can be trained by obtaining data descriptive of the machine-learned model and obtaining one or more sets of training data comprising image data labeled to indicate whether there is a presence of sensitive content. The training data can include positive training data and/or negative training data. The training data can be human annotated or machine-annotated to indicate regions in the training data that contain sensitive information. The system can train the machine-learned model based on the training data. The system can determine one or more parameters of a loss function based on the one or more sets of training data. The system can modify at least a portion of the machine-learned model based at least in part on the one or more parameters of the loss function. For example, one or more weights or other model attributes can be modified based on the loss function.

According to an example aspect of the present disclosure, the machine-learned masking system can be implemented by a client computing device participating in a video conference or projective display. For example, the masking system can be implemented as a thin client within a web browser application at the client computing device. In another example, the masking system can be implemented as a thick client within a dedicated application such as a videoconferencing or content sharing application. In this manner, source content to be shared by a user of the client computing device can be analyzed and rendered with sensitive information concealed prior to transmitting the content from the client computing device. In this manner, the sensitive information is not communicated from the client computing device which can enhance security and privacy of the sharing user.

A client-side implementation of the masking system in accordance with an example embodiment can include a machine-learned system that executes directly in a client web browser or other web application. This type of web-based processing pipeline enables real-time, in-browser performance on most modern devices. The machine-learned system can combine efficient on-device machine-learned models, application programming interfaces such as WebGL, and web-based machine-learned inference models via libraries such as XNNPACK and/or tensor flow lite (TFLite). In some examples, a web pipeline of the system can leverage a low-level binary code format (e.g., WebAssembly) designed specifically for web browsers that improves speed for compute-heavy tasks. The browser can convert WebAssembly instructions into native machine code that executes faster than traditional code (e.g., JavaScript Code).

According to an example aspect of the disclosed technology, model inference for the machine-learned masking system can execute locally on a client's central processing unit (CPU) for low power consumption and wide device coverage. To enable real-time performance, the machine-learned model(s) can be designed efficiently with inference accelerated by an API library such as XNNPACK. In this manner, the machine-learned system can include image segmentation models that run in real-time by the web browser. In accordance with some examples, one or more portions of the machine-learned content sharing system can be implemented by a host computing device such as a server computing device that hosts the videoconferencing system.

The present disclosure provides a number of technical effects and benefits. As one example technical effect and benefit, the systems and methods of the present disclosure enable enhanced privacy and security when sharing content, such as to participants of a multi-attendee video conference. More particularly, the present disclosure automatically identifies sensitive information in source content and modifies the source content such that the sensitive information is not visible to others. The disclosed technology provides a machine-learned sharing system that leverages machine-learned techniques to identify sensitive information within source content that is being shared. The system can identify particular regions within content that contain sensitive information and precisely mask those regions from display to others. In this manner, the system can enhance privacy and security when sharing content by offloading the identification and modification tasks from a sharing user. The system can first provide the content to a machine-learned system that has been trained to identify such content and automatically mask it from visibility in a display of the content to other users. Further, by masking the source content, the sharing user can view the source content in its entirety while other users only view the non-sensitive portions of the content. Further, by utilizing image processing techniques, the system can avoid parsing the source content to understand its contents. This can further promote privacy by the system avoiding a deep understanding of the content through parsing.

As another technical effect, the systems and methods of the present disclosure also result in the conservation of computing resources. In particular, the disclosed technology provides an image-based processing technique for identifying sensitive information within shared content. Source content of various media or content types can be converted to image data for processing by the machine-learned sharing system. The source content can be converted into multiple image frames that are passed to the model for image processing. The model can identify sensitive information using image classifiers that execute efficiently and in real-time. The model can be trained using image data such as images of web pages or other browser images that contain sensitive information such as advertisements in various forms, shapes, colors, etc. In this manner during deployment, the system can quickly and efficiently identify sensitive information and mask the sensitive information in a display of the source content. This technique can be compared with a more compute intensive process of manually identifying sensitive information and generating alternate content in its place.

With reference now to the Figures, example embodiments of the present disclosure will be discussed in further detail.

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, or any other computer device that is configured such that it can allow a user to participate in a video conference. The client computing device 102 can include one or more processor(s) 112, memory 114, an associated display device 120, a video conferencing application 122, and a camera 124.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing system 130 (e.g., one or more video conferencing applications 122, etc.). The client computing device 102 can implement the instructions to execute aspects of the present disclosure, including directing communications with server computing system 130, providing a video conferencing application 122 and/or video stream to a user, processing requests from users for execution of content sharing, identifying sensitive information in shared content, and automatically masking such sensitive information in shared displays.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The client computing device 102 can execute a video conferencing application 122. The video conferencing application can capture image data from a camera 124 and transmit that data to the server computing system. The client computing device 102 can receive, from the server computing system 130 image data from one or more other participants of the video conference (e.g., other client computing devices 102). The client computing device 102 can then display the received image data to users of the client computing device 102 on associated display device 120. In some example embodiments, the camera 124 collects image data from one or more users. The camera can be any device capable of capturing visual data.

More particularly, the client computing device 102 can receive one or more video streams from the server computing system 130. The client computing device 102 can, as an example, display the received video streams in the associated display device 120 (e.g., a laptop display device, a smartphone display device, a communicatively connected display device, etc.). For example, the client computing device 102 can receive a request from a first user at a first client device to share content within the GUI provided by the video conferencing system. The GUI can include a plurality of slates including one or more slates associated with respective video streams of one or more users. The content can be shared in a slate viewable by attendees at respective client devices.

Additionally, or alternatively, in some implementations, the client computing device 102 can generate a video stream and send the video stream to the server computing system 130 (e.g., via network(s) 180). More particularly, the client computing device 102 can capture a video stream using camera 124 (e.g., an integrated webcam, communicatively connected camera device, etc.). The client computing device 102 can encode the captured video (e.g., as specified by instructions 118, etc.).

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive video streams from a plurality of client computing devices 102 (e.g., via network 180) respectively associated with a plurality of video conference attendees. The video conferencing system 140 can provide the video streams to each of the client computing devices 102. Further, the video conferencing system 140 can manage provided stream quality. In some implementations, the video conferencing system 140 can manage provided stream quality by transmitting requests to client computing devices 102 to provide video streams with a certain quality and/or resolution. In such fashion, the server computing system 130 can utilize video conferencing system 140 to facilitate the functionality of the video conferencing applications 122 on each client computing device 102.

It is noted that video conferencing application 122 can be considered part of the video conferencing system 140 in example embodiments. Further, although FIG. 1 depicts a video conferencing system example, it will be appreciated that a projector system may be implemented similarly. For instance, client computing device 102 may be in communication with a projector that renders shared content according to example embodiments of the present disclosure.

Figure 2:
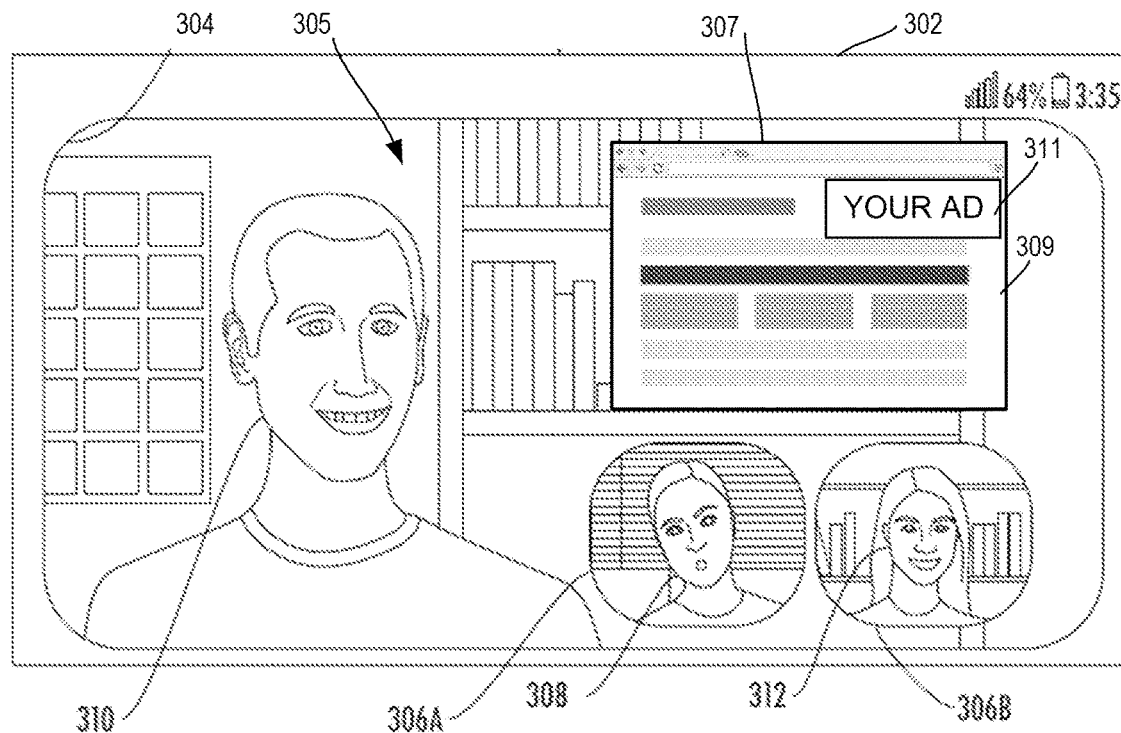
FIG. 2 depicts an example graphical user interface of a multi-attendee video conferencing system including shared content according to example embodiments of the present disclosure.

FIG. 2 depicts an example graphical user interface of a multi-attendee video conferencing application 122 and video conferencing system 140 according to example embodiments of the present disclosure. As shown at 301, client device 302 (e.g., a smartphone, tablet, laptop computer, etc.) can display a video stream of a first attendee 310 in a primary display region or slate 304 of GUI 305. In some examples, the speaking role of the first attendee 310 can be a dominant speaking role (e.g., the attendee that is currently speaking, etc.) and based on the dominant speaking role of the first attendee 310, the client device 302 can display the video stream of the first attendee 310 in primary slate 304. Although the primary slate 304 is depicted as using the entirety of the display of client device 302, it should be noted that the primary slate 304 does not necessarily need to do so. As an example, the primary slate 304 may use 80% of the available display of the client device 302.

The client device 302 can display a video stream for a second attendee 308 and a video stream for a third attendee 312 in video slates 306A and 306B. For example, the speaking roles of second attendee 308 and third attendee 312 can be non-dominant speaking roles (e.g., the attendees that are not currently speaking, etc.). Based on the non-dominant speaking roles of the second attendee 308 and the third attendee 312, the client device 302 can display the video streams of the second attendee 308 and the third attendee 312 respectively in the video slates 306A and 306B. Additionally, or alternatively, it should be noted that the video slates 306A and 306B do not necessarily need to be overlaid on the primary slate 304. In some implementations, the video slates 306A and 306B can instead be displayed adjacent to the primary slate 304. Additionally, three video slates are provided by way of example only. A multi-attendee videoconference may include any number of slates and associated video streams.

As shown at 301, graphical user interface (GUI) 305 includes shared slate 307 in which a first attendee shares digital content with other attendees of the video conference. In this example, the slate 307 displays a web page 309 which can be rendered using a web browser client. The web browser can respond and change in real-time as the first attendee of the video conference interacts with the web browser. For example, the first attendee can browse the web, click links, scroll, search, and do all of the typical things a user would do with a web browser. The shared slate can render displays of various content and various applications for the video conferencing system to facilitate sharing. By way of example, a web browser is capable of executing hyper-text markup language (HTML) or other code to render a display of web page 309.

In the example of FIG. 2, web page 309 includes an advertisement 311. In many instances, advertisements rendered in web pages are personalized based on demographics or other information associated with the client device. Such advertisements rendered by the web page may be very personal to the sharing user's browsing history or PII kind of preferences. While an advertisement 311 on a web page 309 is shown as an example of sensitive content in FIG. 2, it will be appreciated that numerous types of personal information may be included in web pages 309 or other types of content that is being shared. For example, sensitive information may include a shopping cart, personal information, confidential information, proprietary information or any other type of information the system is trained to detect.

Figure 3:
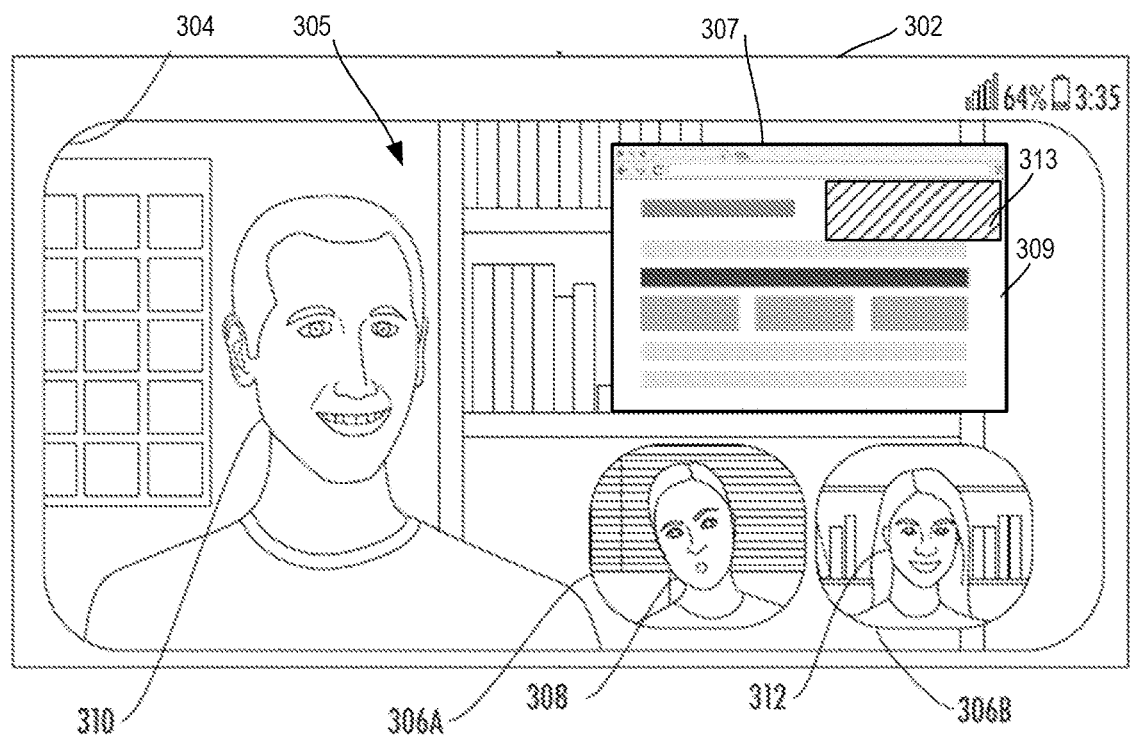
FIG. 3 depicts an example graphical user interface of a multi-attendee video conferencing system including selective masking of sensitive information in shared content according to example embodiments of the present disclosure.

FIG. 3 depicts client device 302 and graphical user interface 305 including a rendering of web page 309 in accordance with selective masking techniques of the present disclosure. As illustrated in FIG. 3, advertisement 308 has been masked in the rendering of web page 309 so that the sensitive information is not visible to other attendees of the video conference. The machine-learned sharing system can selectively mask the sensitive information in web page 309 when it is shared by a user with other individuals such as viewers of a projective display or participants in a video conference. The system can automatically identify advertisement 311 as sensitive content and mask the content so that it is not visible in the rendered display of the web page for additional users. The system can generate a mask that identifies the region in the web page 309 that contains sensitive content. Using the mask, the system can render the GUI 305 including the web page 309 with the sensitive content masked at the one or more regions identified by the mask as shown at 313. By way of example, the system can analyze the shared content and determine one or more colors that are representative of the content. The system can render the one or more representative colors at the one or more regions identified by the mask as shown at 313. In another example, the system can render a watermark, greyscale, or other content in place of the sensitive content.

Figure 4:
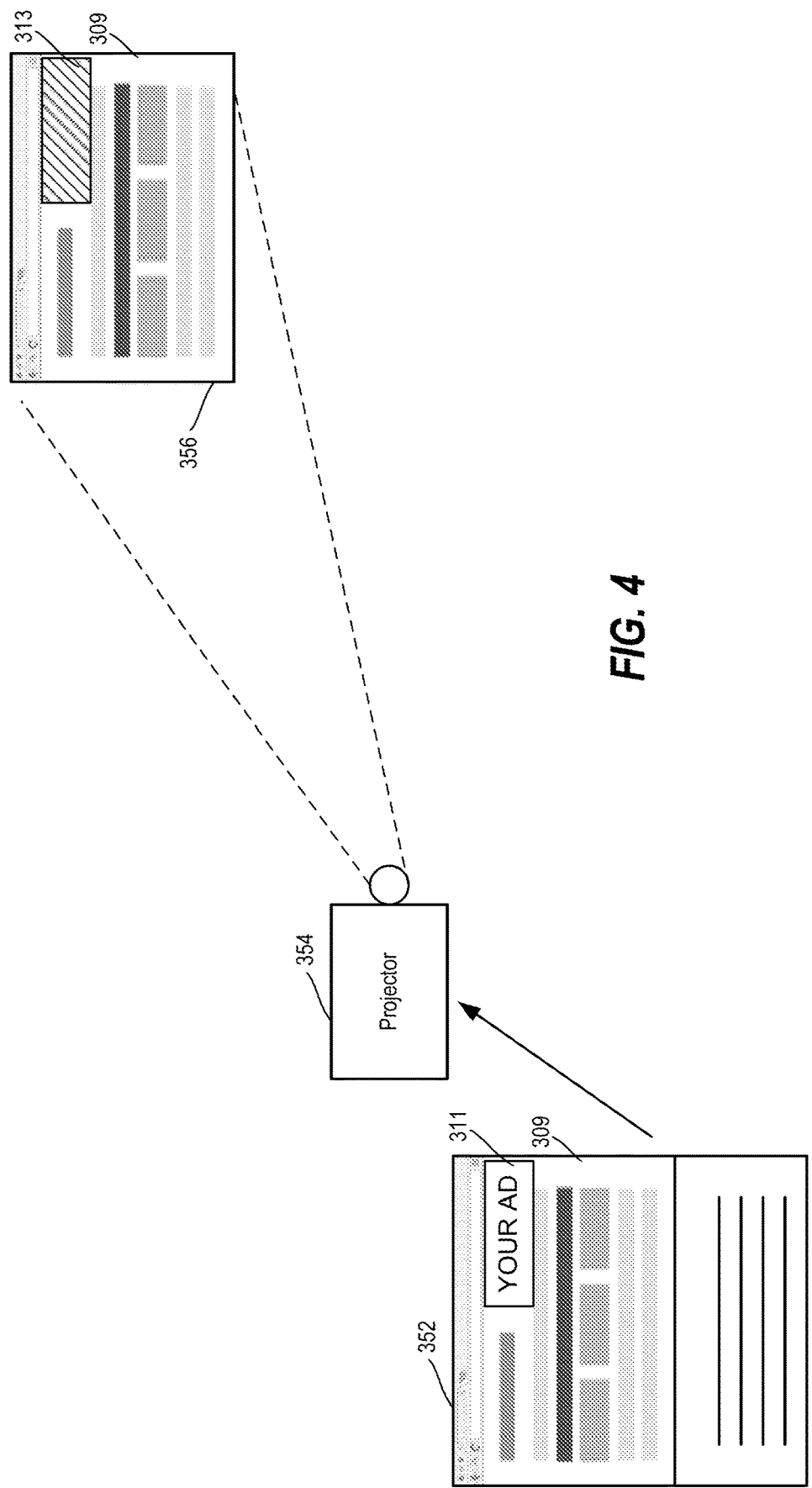
FIG. 4 depicts an example graphical user interface of a display system including a projector according to example embodiments of the present disclosure.

FIG. 4 depicts an example graphical user interface of a display system including a projector 354 and laptop 352 according to example embodiments of the present disclosure. A projector 354 or other component of a display system may selectively mask sensitive information in a display of a shared content stream. A projector 354 or other device in communication with a projector can access a content stream to be shared, analyze the content using a machine-learned model to identify sensitive information within the content, and render a display of the content for projection to other viewers such that the sensitive information is not visible. For instance, the projector can mask the sensitive information by hiding, replacing, or supplementing the content such that the sensitive information is not visible in a projected display of the content. As illustrated in FIG. 4, advertisement 308 has been masked in the rendering of web page 309 so that the sensitive information is not visible to other attendees of the video conference. Using the mask, the system can render a GUI including web page 309 with the sensitive content masked at the one or more regions identified by the mask as shown at 313.

Figure 5:
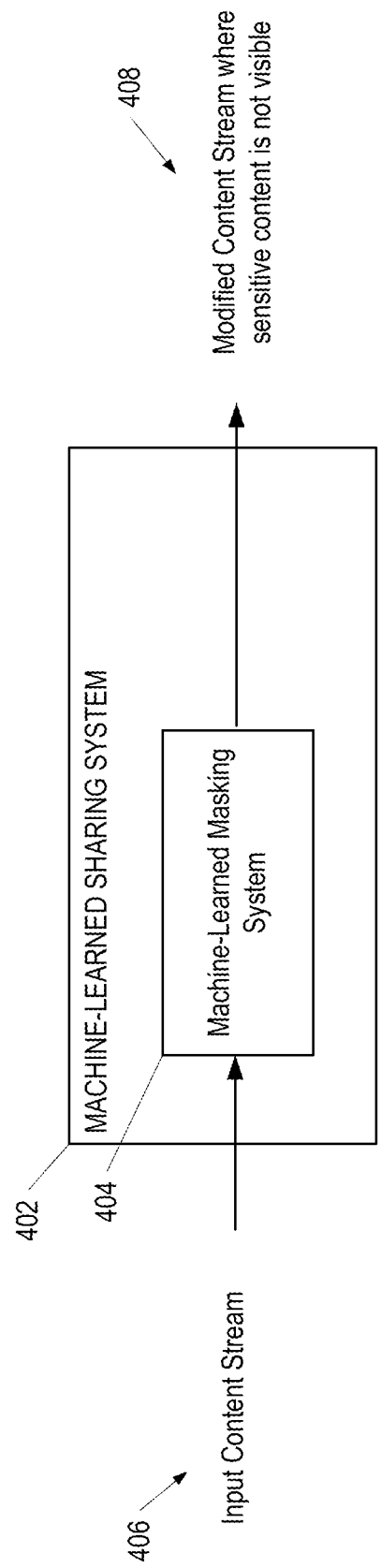
FIG. 5 is a block diagram depicting an example machine-learned sharing system in accordance with example embodiments of the present disclosure.

FIG. 5 is a block diagram depicting an example machine-learned sharing system in accordance with example embodiments of the present disclosure. By way of example, a videoconferencing system, projector system, or other content sharing system can include a machine-learned sharing system 402 that is configured to analyze an input content stream that is shared by a first user, identify sensitive information within the content, and render a display of the content for others such that the sensitive information is not visible. For instance, the videoconferencing system can mask the sensitive information by hiding, replacing, or supplementing the content such that the sensitive information is not visible in the display of the content for other attendees of the videoconference.

Machine-learned sharing system 402 can be provided for selectively masking sensitive information in content that is to be shared by a first user with other users, such as participants in a video conference or viewers of a projected display. The machine-learned sharing system 402 can receive an input content stream such as a web page, document, video, slideshow, etc. to be shared by the first user. The sharing system can input the content stream into a machine-learned masking system 404 that is configured to identify sensitive information within the content to be shared. The machine-learned masking system 404 can include one or more machine-learned models that are trained to identify sensitive information such as personal, confidential, and/or proprietary information within content. The machine-learned model(s) can be trained to identify different types of sensitive information by training the model(s) using training data that includes content labeled to identify the target sensitive information to be located. The machine-learned model can detect one or more regions in the shared content that contain sensitive information and generate one or more masks that represent the one or more region(s). The system can render or otherwise provide a modified content stream 408 that masks the detected regions so that the sensitive information is not visible. The system can mask the sensitive information by hiding, replacing, covering, obscuring, or otherwise causing the sensitive information not be visible in display of the content that is viewable by the additional users. Various techniques can be used to implement the machine-learned sharing system. In accordance with example embodiments, a machine-learned masking system can include one or more machine-learned classification, recognition, detection, clustering models that are configured to receive a source content stream and generate one or masks that represent sensitive content regions within the source content stream. The system can generate a modified content stream with the sensitive information masked so that it is not visible in a display of the shared content.

Figure 6:
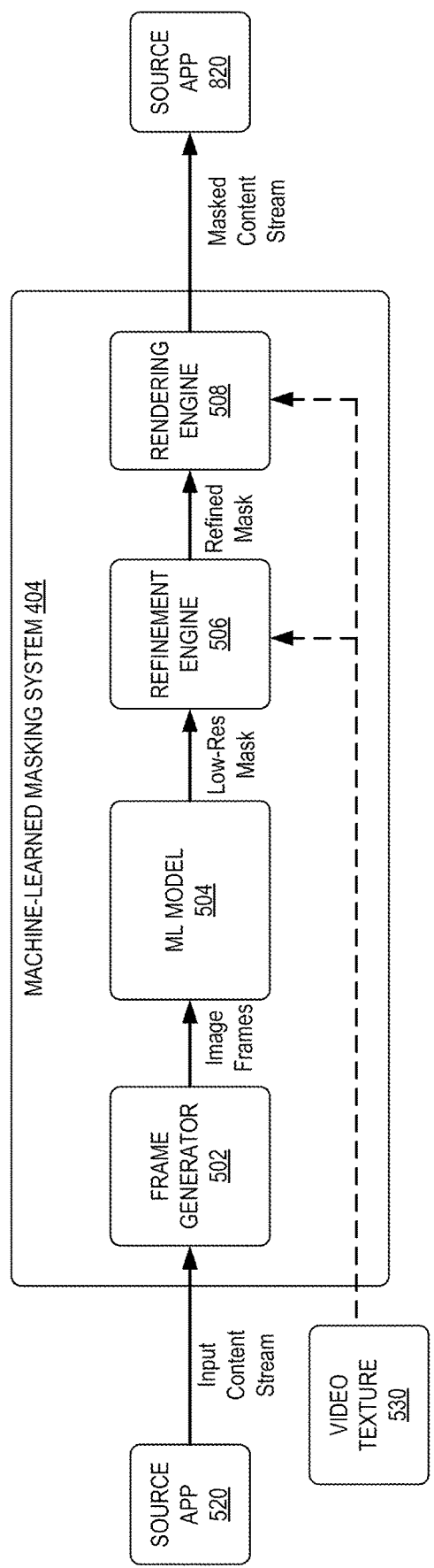
FIG. 6 is a block diagram depicting an example machine-learned masking system in accordance with example embodiments of the present disclosure.

FIG. 6 is a block diagram depicting an example machine-learned masking system in accordance with example embodiments of the present disclosure. FIG. 6 depicts an example of a machine-learned masking system implemented by a client computing device participating in a video conference or projective display. For example, the masking system can be implemented as a thin client within a web browser application at the client computing device. In another example, the masking system can be implemented as a thick client within a dedicated application such as a videoconferencing or content sharing application. In this manner, source content to be shared by a user of the client computing device can be analyzed and rendered with sensitive information concealed prior to transmitting the content from the client computing device. In this manner, the sensitive information is not communicated from the client computing device which can enhance security and privacy of the sharing user. In accordance with some examples, one or more portions of the machine-learned content sharing system can be implemented by a host computing device such as a server computing device that hosts the videoconferencing system.

Machine-learned masking system 404 can be executed by or in association with a source application 520 in example embodiments. The source application can be a web browser, gaming application, or other application capable of generating content for sharing. The source application may provide a full screen share such as a desktop managed by an operating system. The source application 520 can provide an input content stream to the machine-learned masking system 404.

Machine-learned masking system 404 includes a machine-learned model 504 that is configured to analyze image data representative of a shared content stream in order to identify sensitive information. Example machine-learned models may include detection modes, recognition models, classification models, clustering models, or other models. The machine-learned masking system includes a frame generator 502 that is configured to receive the input content stream that is to be shared with other users such as participants in a video conference or viewers of a projector display. The frame generator 502 can convert the content stream into image data for processing by the machine-learned model 504. The frame generator can convert various content types including text content, video content, etc. into image data for processing. In some embodiments, the frame generator 502 can generate a plurality of image frames from the source content. The frame generator 502 can provide the image frames to the machine-learned model 504. Each image frame can include image data that represents at least a portion of the source content.

The machine-learned model 504 can generate one or more inferences by performing one or more detections, clusterings, classifications, etc. of content in the received image frames. In response to identifying sensitive content within one or more image frames, the model 504 can identify one or more regions of the source content that contain the sensitive information. The model can generate one or more masks that identify the region(s) of the source content that contain sensitive information. For example, the model 504 can generate a mask that identifies the region within one or more of the image frames received from the frame generator.

According to an example aspect of the disclosed technology, the machine-learned model 504 can partition or otherwise divide an image frame into a set of logical partitions representing content portions of the source content. The logical partitions can be generated using image segmentation or other techniques. The model 504 can identify one or more of the logical partitions corresponding to the sensitive content. The mask can be generated in accordance with the one or more logical partitions. For example, the mask can identify one or more regions of the source content that correspond to the one or more logical partitions.

The mask(s) generated by the model can be provided to a rendering engine 508 that generates a masked content stream where the source content in region(s) identified by the mask(s) is not visible. In some examples, the model generates one or more low-resolution masks that are provided to refinement engine 506 that generates one or more refined masks which are in turn provided to the rendering engine 508. The refinement engine may receive image data from the source content such as video texture data 530. The refinement engine can generate a refined or high-resolution mask that more accurately defines the region(s) containing sensitive content. Using a low-resolution mask or a refined mask, the rendering engine 508 can generate a masked content stream with the sensitive information masked from display. The rendering engine can utilize various techniques to mask the sensitive information. By way of example, the rendering engine can hide, cover, and/or replace the sensitive information. In some examples, the rendering engine can render one or more representative colors in the region(s) identified by the mask(s). The rendering engine may determine a representative color from the source content, such as a representative color that is an average of color values from the source content. Other techniques can be used to determine the representative color. The rendering engine can replace or otherwise mask the source content at the identified regions by rendering the representative color(s) at the regions identified by the mask(s). In other examples, other representative content such as a watermark, greyscale, black or other content can be used in place of the sensitive information.

The masking system can provide the masked source content for display by one or more applications. For instance, the source content may originate as one or more web pages that are accessed by a client web browser. A first participant in a video conference or a user of a projector system may select the web browser content for sharing in the video conference or for display by the projector system. The masking system can generate the masked content stream which is provided to the web browser for display. A video-conferencing system or the projector system can display the masked content using the client web browser.

Figure 7:
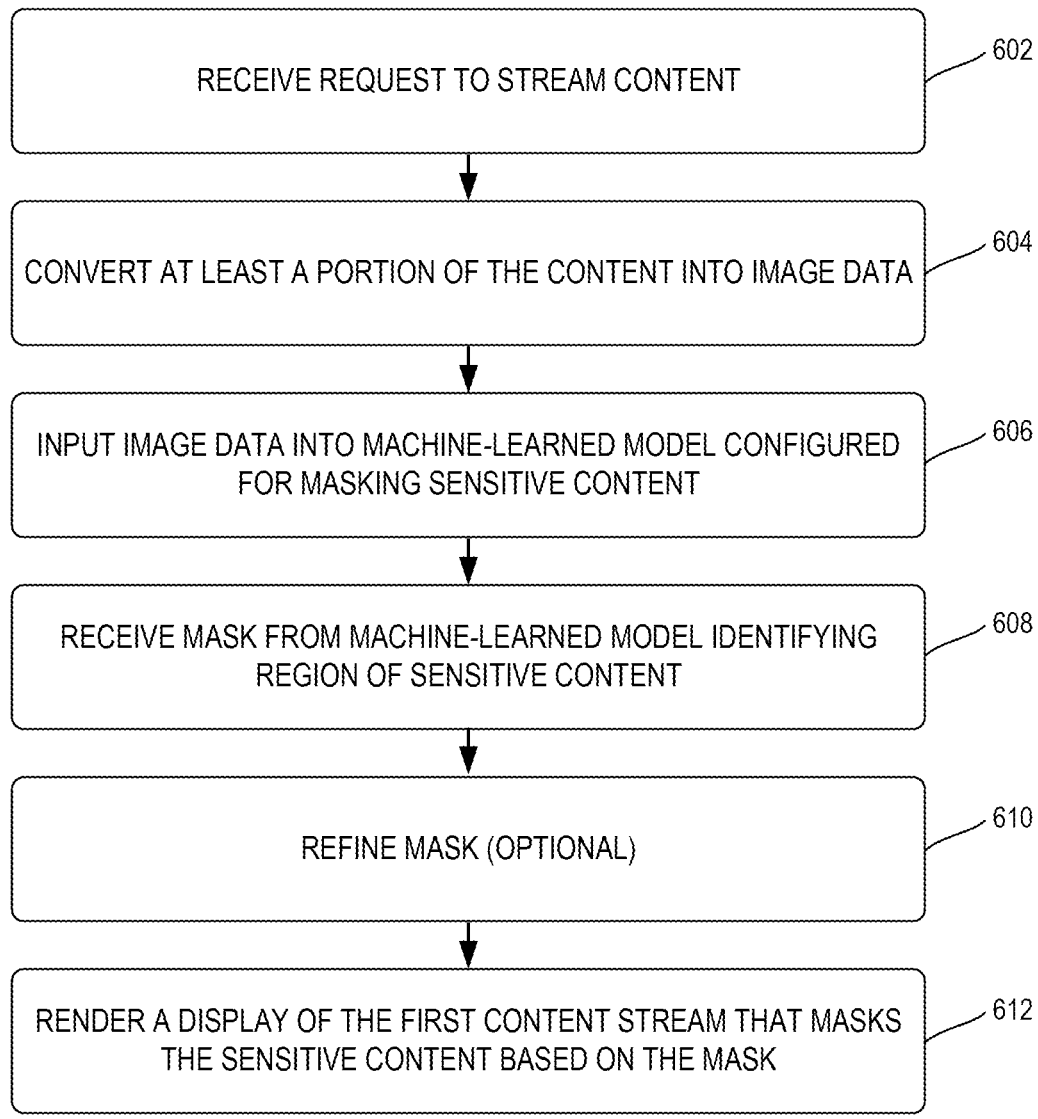
FIG. 7 is a flow diagram depicting an example method of selectively masking sensitive information in shared content in accordance with example embodiments of the present disclosure.

FIG. 7 is a flow diagram depicting an example method of selectively masking sensitive information in shared content in accordance with example embodiments of the present disclosure. One or more portions of method 600 can be implemented by one or more computing devices such as, for example, one or more computing devices of a computing environment 100 as illustrated in FIG. 1 or any other computing environment. One or more portions of method 600 can be implemented as an algorithm on the hardware components of the devices described herein to, for example, selectively mask sensitive information in shared content. Although FIG. 7 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

At 602, method 600 includes receiving one or more requests to stream content for sharing with one or more additional users such as attendees of a multi-attendee video conference or viewers of a projective display. More particularly, one or more computing devices can receive one or more requests to stream content associated with multiple attendees for display at a client device. The one or more requests can be issued by a client device associated with a first participant of the videoconference.

At 604, method 600 includes converting at least a portion of the content stream to be shared into image data representative of a display of the content stream. In some examples, converting the content stream into image data can include converting the content stream into a plurality of image frames that each represent at least a portion of the first content. In example embodiments, the plurality of image frames can be sequential image frames representing a sequence in time of displays of the source content. In some examples, a frame generator is configured to receive a content stream that is to be shared and convert the content stream into image data for processing by the machine-learned model. The frame generator can convert various content types including text content, video content, etc. into image data for processing. In some embodiments, the frame generator can generate a plurality of image frames from the source content. The frame generator can provide the image frames to the machine-learned model. Each image frame can include image data that represents at least a portion of the source content.

At 606, method 600 includes inputting the image data into a machine-learned model that is configured for masking a sensitive content. The frame generator can input the plurality of image frames generated from the source content in example embodiments.

At 608, method 600 includes receiving one or more masks from the machine-learned model. The one or more masks identify one or more regions of sensitive content in the source content. The machine-learned model can perform one or more classifications of content in the received image frames. In response to identifying sensitive content within one or more image frames, the model can identify one or more regions of the source content that contain the sensitive information. The model can generate one or more masks that identify the region(s) of the source content that contain sensitive information. For example, the model can generate a mask that identifies the region within one or more of the image frames received from the frame generator. In some examples, the machine-learned model can partition or otherwise divide an image frame into a set of logical partitions representing content portions of the source content. The logical partitions can be generated using image segmentation or other techniques. The model can identify one or more of the logical partitions corresponding to the sensitive content. The mask can be generated in accordance with the one or more logical partitions. For example, the mask can identify one or more regions of the source content that correspond to the one or more logical partitions.

At 610, the one or more masks are optionally refined. In some examples, the classification model generates one or more low-resolution masks that are provided to a refinement engine that generates one or more refined masks which are in turn provided to the rendering engine. The refinement engine may receive image data from the source content such as video texture data. The refinement engine can generate a refined or high-resolution mask that more accurately defines the region(s) containing sensitive content.

At 612, method 600 includes rendering a display of the content stream that masks the sensitive content based on the one or more masks. Using a low-resolution mask or a refined mask, the rendering engine can generate a masked content stream with the sensitive information masked from display. The rendering engine can utilize various techniques to mask the sensitive information. By way of example, the rendering engine can hide, cover, and/or replace the sensitive information. In some examples, the rendering engine can render one or more representative colors in the region(s) identified by the mask(s). The rendering engine may determine a representative color from the source content, such as a representative color that is an average of color values from the source content. Other techniques can be used to determine the representative color. Masking can be performed in any form. For instance, the system can provide any color, greyscale, black, watermarked, or other content at the one or more regions represented by the mask. The rendering engine can replace or otherwise mask the source content at the identified regions by rendering the representative color(s) at the regions identified by the mask(s).

Figure 8:
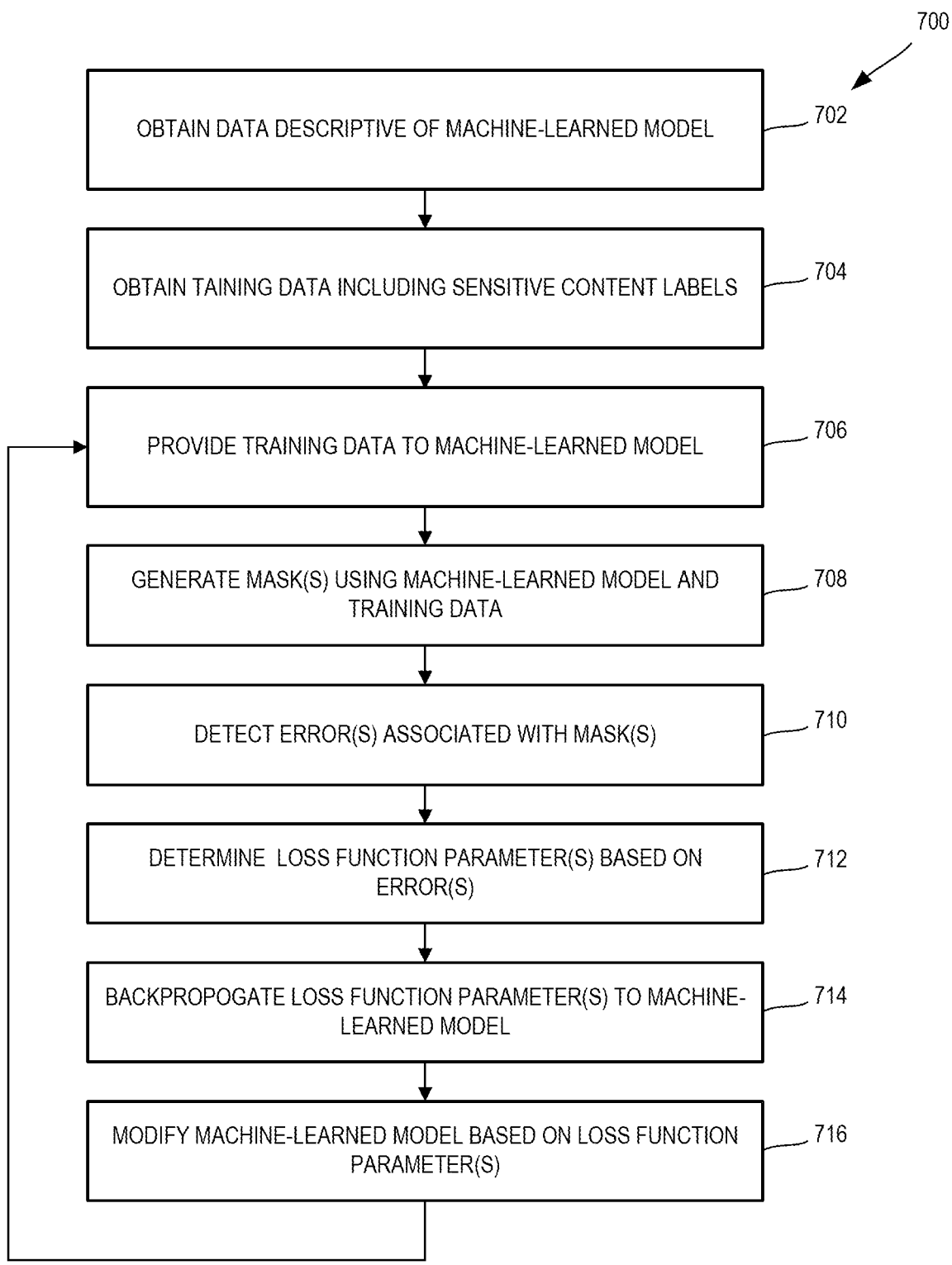
FIG. 8 is a flow diagram depicting an example method of training a machine-learned sharing system in accordance with example embodiments of the present disclosure.
Figure 11:
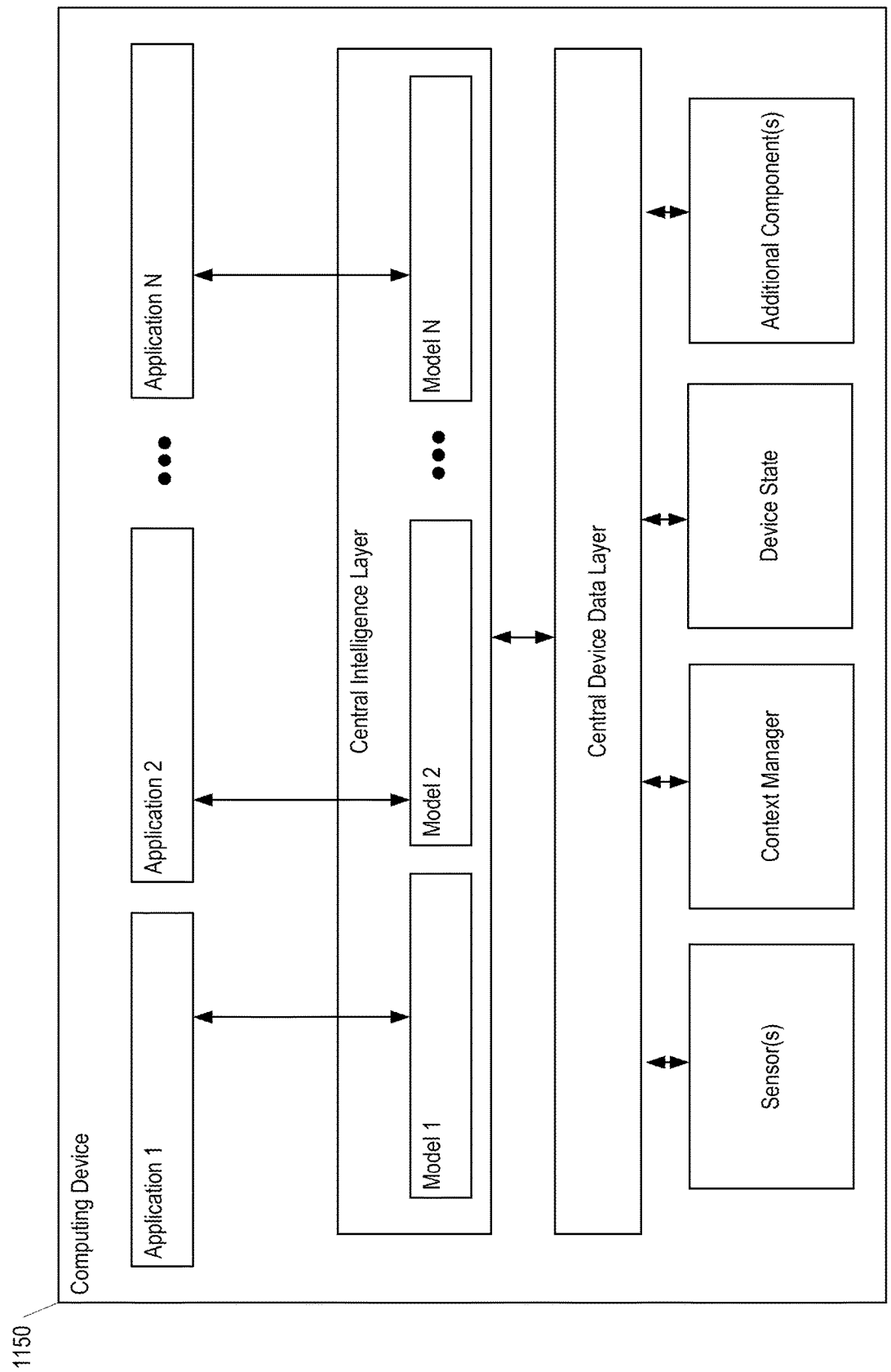
FIG. 11 depicts a block diagram of an example computing device that can be used to implement example embodiments in accordance with the present disclosure.

FIG. 8 is a flowchart depicting an example method 700 of training a machine-learned sharing system in accordance with example embodiments of the present disclosure. One or more portions of method 700 can be implemented by one or more computing devices such as, for example, one or more computing devices of a computing environment 100 as illustrated in FIG. 1 or any other computing environment. One or more portions of method 700 can be implemented as an algorithm on the hardware components of the devices described herein to, for example, train a machine-learned model to detect and identify sensitive information in shared content. In example embodiments, method 900 may be performed by a model trainer 1060 using training data 1062 as illustrated in FIG. 11.

At (702), method 700 includes obtaining data descriptive of a machine-learned model. Example machine-learned models may include detection modes, recognition models, classification models, clustering models, or other models. At (704), method 700 includes obtaining training data including sensitive content labels. The training data can include content labeled to identify target sensitive information to be identified. The training data can include web pages, videos, slideshows, text, or any other content that is annotated to indicate the presence of sensitive information. For instance, the data may be annotated to indicate sensitive information at a particular region of a display of the content.

At (706), the training data is provided to the machine-learned model. At (708), one or more masks are generated by the machine-learned model in response to the training data. For instance, in response to a particular image frame, an inference may be generated indicating whether the frame contains sensitive information and optionally a location or region of the sensitive information.

At (710), one or more errors are detected in association with the generated masks. For example, the model trainer may detect an error with respect to whether sensitive information was detected and/or a location at which the sensitive information was detected. The model trainer may determine that an inference of sensitive information is not generated when such an inference should have been generated. In another example, the model trainer may determine that an inference of sensitive information was generated when the inference should not have been generated.

At (712), one or more loss function parameters can be determined for the model based on the detected errors. In some examples, the loss function parameters can be based on an overall output of the machine-learned model. The loss function parameter(s) can be applied to the model. In some examples, a loss function parameter may include a sub-gradient. A sub-gradient can be calculated for the model.

At (714), the one or more loss function parameters are back propagated to the machine-learned model. For example, a calculated sub-gradient can be back propagated to the model as part of (714).

At (716), one or more portions of the machine-learned model can be modified based on the backpropagation at (714). In some examples, the machine-learned model may be modified based on backpropagation of the loss function parameter.

Figure 9:
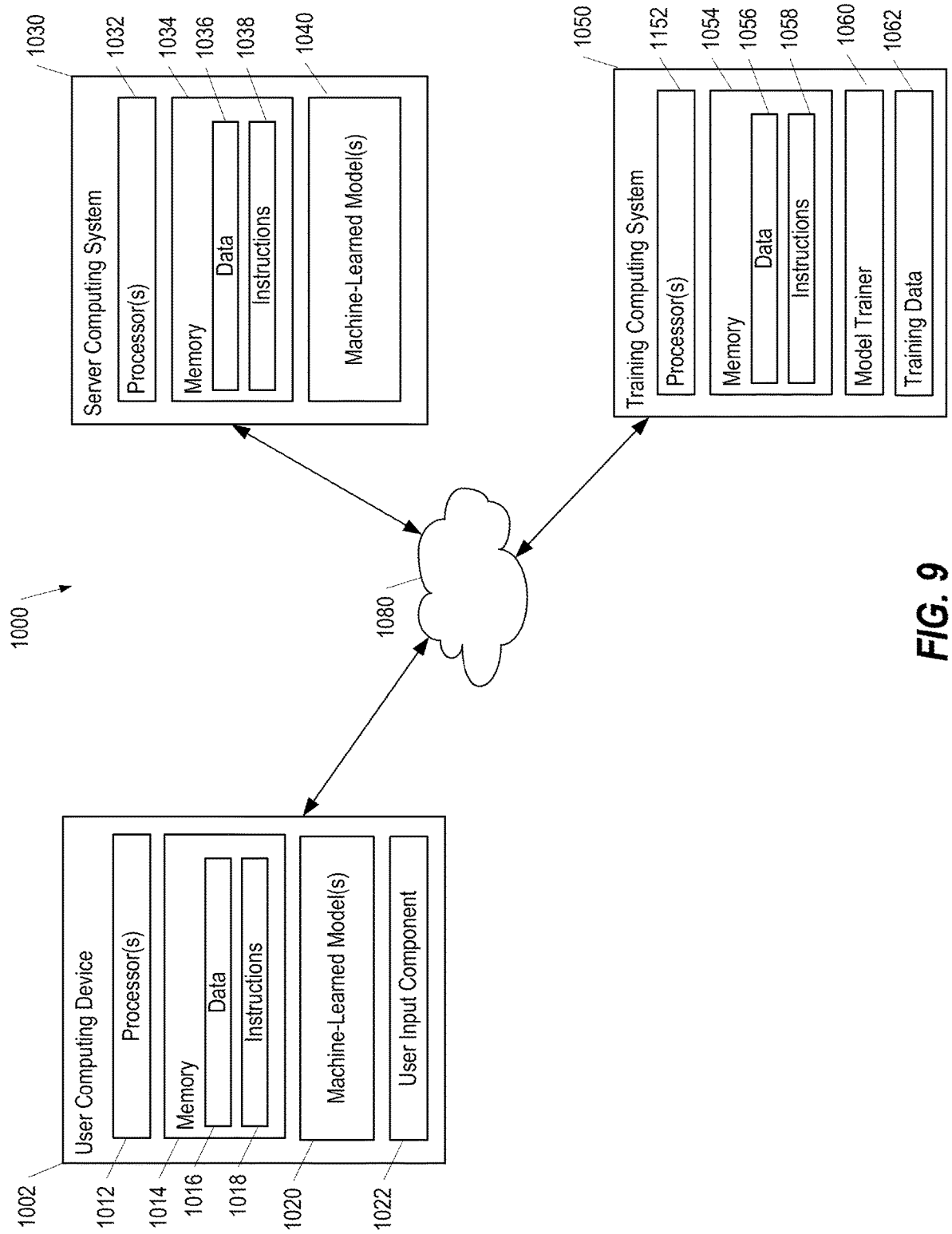
FIG. 9 depicts a block diagram of an example computing system for training and deploying a machine-learned model in accordance with example embodiments of the present disclosure.

FIG. 9 depicts a block diagram of an example computing system 1000 that performs inference generation such as masking of sensitive content according to example embodiments of the present disclosure. The system 1000 includes a user computing device 1002, a server computing system 1030, and a training computing system 1050 that are communicatively coupled over a network 1080.

The user computing device 1002 can be any type of computing device, such as, for example, an interactive object, a personal computing device (e.g., laptop or desktop), a mobile computing device (e.g., smartphone or tablet), a gaming console or controller, a wearable computing device, an embedded computing device, or any other type of computing device.

The user computing device 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 and instructions 1018 which are executed by the processor 1012 to cause the user computing device 1002 to perform operations.

The user computing device 1002 can include one or more portions of a machine-learned model, such as one or more layers of a distributed neural network. The one or more portions of the machine-learned model can generate intermediate feature representations and/or perform inference generation such as sensitive content detection and classification as described herein. Examples of the machine-learned model are shown in FIGS. 4 and 5. However, systems other than the example system shown in these figures can be used as well.

In some implementations, the portions of the machine-learned model can store or include one or more portions of a model such as an image classification model. For example, the machine-learned model can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more portions of the machine-learned model can be received from the server computing system 1030 over network 1080, stored in the user computing device memory 1014, and then used or otherwise implemented by the one or more processors 1012. In some implementations, the user computing device 1002 can implement multiple parallel instances of a machine-learned model (e.g., to perform parallel inference generation across multiple instances of input data).

Additionally or alternatively to the portions of the machine-learned model at the user computing device, the server computing system 1030 can include one or more portions of the machine-learned model. The portions of the machine-learned model can generate intermediate feature representations and/or perform inference generation as described herein. One or more portions of the machine-learned model can be included in or otherwise stored and implemented by the server computing system 130 (e.g., as a component of the machine-learned model) that communicates with the user computing device 1002 according to a client-server relationship. For example, the portions of the machine-learned model can be implemented by the server computing system 1030 as a portion of a web service (e.g., an image processing service). Thus, one or more portions can be stored and implemented at the user computing device 1002 and/or one or more portions can be stored and implemented at the server computing system 1030. The one or more portions at the server computing system can be the same as or similar to the one or more portions at the user computing device.

The user computing device 1002 can also include one or more user input components 1022 that receive user input. For example, the user input component 1022 can be a touch-sensitive component that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the server computing system 1030 to perform operations.

In some implementations, the server computing system 1030 includes or is otherwise implemented by one or more server computing devices. In instances in which the server computing system 1030 includes plural server computing devices, such server computing devices can operate according to sequential computing architectures, parallel computing architectures, or some combination thereof.

As described above, the server computing system 1030 can store or otherwise include one or more portions of the machine-learned model. For example, the portions can be or can otherwise include various machine-learned models. Example machine-learned models include neural networks or other multi-layer non-linear models. Example neural networks include feed forward neural networks, deep neural networks, recurrent neural networks, and convolutional neural networks. One example model is discussed with reference to FIGS. 5 and 6.

The user computing device 1002 and/or the server computing system 1030 can train the machine-learned models 1020 and 1040 via interaction with the training computing system 1050 that is communicatively coupled over the network 1080. The training computing system 1050 can be separate from the server computing system 1030 or can be a portion of the server computing system 1030.

Training computing system 1050 includes one or more processors 1052 and a memory 1054. The one or more processors 1052 can be any suitable processing device (e.g., a processor core, a microprocessor, an ASIC, a FPGA, a controller, a microcontroller, etc.) and can be one processor or a plurality of processors that are operatively connected. The memory 1054 can include one or more non-transitory computer-readable storage mediums, such as RAM, ROM, EEPROM, EPROM, flash memory devices, magnetic disks, etc., and combinations thereof. The memory 1054 can store data 1056 and instructions 1058 which are executed by the processor 1052 to cause the training computing system 1050 to perform operations. In some implementations, the training computing system 1050 includes or is otherwise implemented by one or more server computing devices.

The training computing system 1050 can include a model trainer 1060 that trains a machine-learned model including portions stored at the user computing device 1002 and/or the server computing system 1030 using various training or learning techniques, such as, for example, backwards propagation of errors. In other examples as described herein, training computing system 1050 can train a machine-learned model prior to deployment for provisioning of the machine-learned model at user computing device 1002 or server computing system 1030. The machine-learned model can be stored at training computing system 1050 for training and then deployed to user computing device 1002 and server computing system 1030. In some implementations, performing backwards propagation of errors can include performing truncated backpropagation through time. The model trainer 1060 can perform a number of generalization techniques (e.g., weight decays, dropouts, etc.) to improve the generalization capability of the models being trained.

In particular, the model trainer 1060 can train the models 1020 and 1040 based on a set of training data 1062. The training data 1062 can include, for example, a plurality of instances of source content data, where each instance of content data has been labeled with ground truth inferences such as indications of sensitive information. For example, the label(s) for each training image can describe the position of sensitive content. In some implementations, the labels can be manually applied to the training data by humans. In some implementations, the models can be trained using a loss function that measures a difference between a predicted inference and a ground-truth inference. In implementations which include multiple portions of a single model, the portions can be trained using a combined loss function that combines a loss at each portion. For example, the combined loss function can sum the loss from a portion with the loss from another portion to form a total loss. The total loss can be backpropagated through the model.

In some implementations, if the user has provided consent, the training examples can be provided by the user computing device 1002. Thus, in such implementations, the model 1020 provided to the user computing device 1002 can be trained by the training computing system 1050 on user-specific data received from the user computing device 1002. In some instances, this process can be referred to as personalizing the model.

The model trainer 1060 includes computer logic utilized to provide desired functionality. The model trainer 1060 can be implemented in hardware, firmware, and/or software controlling a general purpose processor. For example, in some implementations, the model trainer 160 includes program files stored on a storage device, loaded into a memory and executed by one or more processors. In other implementations, the model trainer 1060 includes one or more sets of computer-executable instructions that are stored in a tangible computer-readable storage medium such as RAM hard disk or optical or magnetic media.

The network 1080 can be any type of communications network, such as a local area network (e.g., intranet), wide area network (e.g., Internet), or some combination thereof and can include any number of wired or wireless links. In general, communication over the network 1080 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 9 illustrates one example computing system that can be used to implement the present disclosure. Other computing systems can be used as well. For example, in some implementations, the user computing device 1002 can include the model trainer 1060 and the training data 1062. In such implementations, the models 1020 can be both trained and used locally at the user computing device 1002. In some of such implementations, the user computing device 1002 can implement the model trainer 1060 to personalize the model 1020 based on user-specific data.

Figure 10:
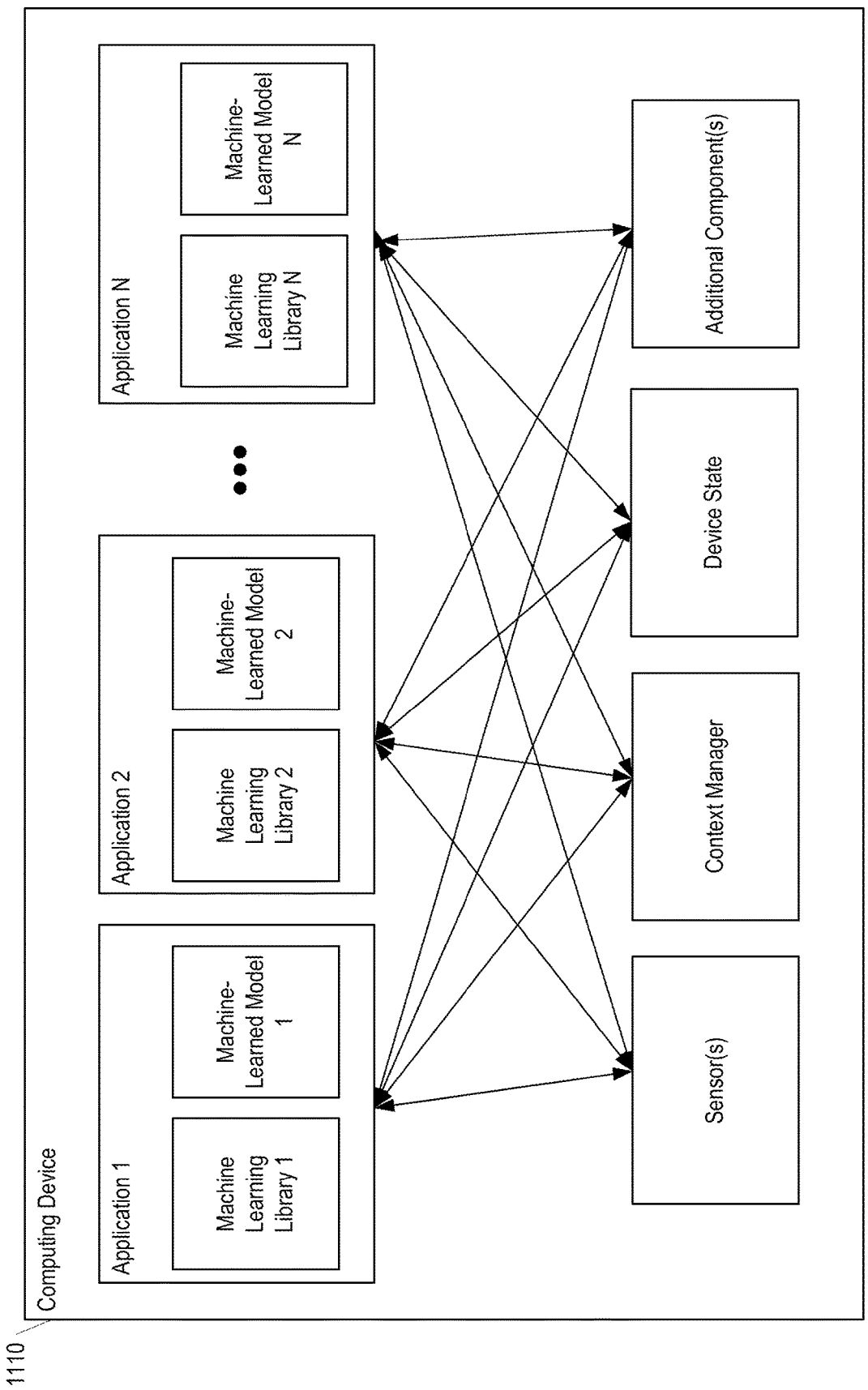
FIG. 10 depicts a block diagram of an example computing device that can be used to implement example embodiments in accordance with the present disclosure.

FIG. 10 depicts a block diagram of an example computing device 1110 that performs according to example embodiments of the present disclosure. The computing device 1110 can be a user computing device or a server computing device.

The computing device 1110 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 10, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 11 depicts a block diagram of an example computing device 1150 that performs according to example embodiments of the present disclosure. The computing device 1150 can be a user computing device or a server computing device.

The computing device 1150 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 10, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 1150.

The central intelligence layer can communicate with a central device data layer. The central device data layer can be a centralized repository of data for the computing device 1150. As illustrated in FIG. 11, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for sharing content within a videoconferencing application, comprising:

receiving, by a computing system comprising one or more computing devices, a request from a first participant in a video conference to share with one or more additional participants of the video conference a first content stream within the videoconferencing application;

converting, by the computing system, at least a portion of the first content stream into image data representative of a display of the first content stream;

inputting, by the computing system, the image data representative of the display of the first content stream into a machine-learned model configured for masking sensitive content within shared content;

processing, by using the machine-learned model, the image data representative of the display of the first content stream to generate a first mask indicative of a region within the first content stream that contains sensitive content; and rendering, by the computing system, for the video conference a display of the first content stream that masks the sensitive content based at least in part on the first mask indicative of the region of the first content stream having the sensitive content.

2. The computer-implemented method of claim 1, wherein:

said converting the first content stream into image data comprises converting the first content stream into a plurality of image frames, each image frame including image data representing at least a portion of the first content stream;

said inputting the image data representative of the display of the first content stream into the machine-learned model comprises inputting the plurality of image frames into the machine-learned model; and the first mask is indicative of a first region within at least a first frame of the plurality of image frames that includes sensitive content.

3. The computer-implemented method of claim 2, further comprising:

partitioning, by the computing system using the machine-learned model, each frame into a set of logical partitions;

wherein the first mask identifies at least one logical partition of the first frame of the plurality of image frames as containing sensitive content;

wherein rendering for the video conference the display of the first content stream comprises masking the at least one logical partition of the first frame.

4. The computer-implemented method of claim 2, further comprising:

determining, by the computing system with the machine-learned model, that a second frame of the plurality of image frames includes sensitive content; and receiving, by the computing system from the machine-learned model, a second mask indicative of a second region within the second frame that contains sensitive content;

wherein the first region and the second region are at different locations within a display area of the first content stream.

5. The computer-implemented method of claim 1, further comprising:
analyzing, by the computing system, the image data representative of the display of the first content stream to determine representative content of the first content stream;
wherein rendering for the video conference the display of the first content stream that masks the sensitive content comprises rendering the representative content for the region within the first content stream that contains the sensitive content.

6. The computer-implemented method of claim 1, wherein:
the computing system includes a host computing device, a first client computing device associated with the first participant and at least one additional client computing device associated with the one or more additional participants; and
the machine-learned model is configured at the first client computing device.

7. The computer-implemented method of claim 6, wherein:
the videoconferencing application is implemented at least partially by a web browser at the first client computing device.

8. The computer-implemented method of claim 1, wherein:
the computing system includes a host computing device, a first client computing device associated with the first participant and at least one additional client computing device associated with the at least one additional participant; and
the machine-learned model is configured at the host computing device.

9. The computer-implemented method of claim 1, wherein:
the first content stream is generated by a first application of a client device associated with the first participant.

10. The computer-implemented method of claim 1, wherein:
the first content stream is a multimedia content stream including a plurality of content types;
said converting at least a portion of the first content stream into image data representative of the display of the first content stream comprises converting the multimedia content stream into image data representative of the plurality of content types.

11. The computer-implemented method of claim 1, further comprising:
obtaining, by the computing system, data descriptive of the machine-learned model;
obtaining, by the computing system, one or more sets of training data comprising image data labeled to indicate sensitive content; and
training, by the computing system, the machine-learned model based on the one or more sets of training data, wherein training the machine-learned model comprises:
determining one or more parameters of a loss function based on the one or more sets of training data; and
modifying at least a portion of the machine-learned model based at least in part on the one or more parameters of the loss function.

12. A computing system, comprising:
one or more processors; and
one or more non-transitory, computer-readable media that store instructions that when executed by the one or more processors cause the computing system to perform operations, the operations comprising:
receiving a request from a first participant in a video conference to share with one or more additional participants of the video conference a first content stream within a videoconferencing application;
converting at least a portion of the first content stream into image data representative of a display of the first content stream;
inputting the image data representative of the display of the first content stream into a machine-learned model configured for masking sensitive content within shared content;
processing, by using the machine-learned model, the image data representative of the display of the first content stream to generate a first mask indicative of a region within the first content stream that contains sensitive content; and
receiving from the machine-learned model a first mask indicative of a region within the first content stream that contains sensitive content; and
rendering for the video conference a display of the first content stream that masks the sensitive content based at least in part on the first mask indicative of the region of the first content stream having the sensitive content.

13. The computing system of claim 12, wherein:
said converting the first content stream into image data comprises converting the first content stream into a plurality of image frames, each image frame including image data representing at least a portion of the first content stream;
said inputting the image data representative of the display of the first content stream into the machine-learned mode comprises inputting the plurality of image frames into the machine-learned model; and
the first mask is indicative of a first region within at least a first frame of the plurality of image frames that includes sensitive content.

14. The computing system of claim 13, wherein the operations further comprise:
partitioning, by the machine-learned model, each frame into a set of logical partitions;
wherein the first mask identifies at least one logical partition of the first frame of the plurality of image frames as containing sensitive content; and
wherein rendering for the video conference the display of the first content stream comprises masking the at least one logical partition of the first frame.

15. The computing system of claim 13, wherein the operations further comprise:
determining with the machine-learned model that a second frame of the plurality of image frames includes sensitive content; and
receiving from the machine-learned model a second mask indicative of a second region within the second frame that contains sensitive content;
wherein the first region and the second region are at different locations within a display area of the first content stream.

16. The computing system of claim 15, wherein:
the videoconferencing application is implemented at least partially by a web browser at a client computing device.

17. One or more non-transitory computer-readable media that store instructions that, when executed by one or more processors of a computing system, cause the computing system to perform operations comprising:

receiving a first content stream for display to one or more users;

converting the first content stream into a plurality of image frames including image data representative of at least a portion of the first content stream;

inputting the plurality of image frames into a machine-learned model configured for masking sensitive content within shared content;

processing, by using the machine-learned model, the plurality of image frames to generate a first mask indicative of a region within the first content stream that contains sensitive content; and receiving from the machine-learned model a first mask indicative of a region within the first content stream that contains sensitive content; and rendering a display of the first content stream that masks the sensitive content based at least in part on the first mask indicative of the region of the first content stream having the sensitive content.

18. The one or more non-transitory computer-readable media of claim 17, further comprising:

partitioning, by the machine-learned model, each frame into a set of logical partitions;

wherein the first mask identifies at least one logical partition of a first frame of the plurality of image frames as containing sensitive content; and wherein rendering for the display of the first content stream comprises masking the at least one logical partition of the first frame.

19. The one or more non-transitory computer-readable media of claim 17, wherein the first mask is indicative of a first region within at least a first frame of the plurality of image frames that includes sensitive content, the operations further comprising:

determining with the machine-learned model that a second frame of the plurality of image frames includes sensitive content; and receiving from the machine-learned model a second mask indicative of a second region within the second frame that contains sensitive content;

wherein the first region and the second region are at different locations within a display area of the first content stream.

20. The one or more non-transitory computer-readable media of claim 17, wherein:

the first content stream is a multimedia content stream including a plurality of content types; and said converting the first content stream into a plurality of image frames representative comprises converting the multimedia content stream into image data representative of the plurality of content types.

* * * * *